United States Patent
Jacoby et al.

(10) Patent No.: US 12,533,755 B2
(45) Date of Patent: *Jan. 27, 2026

(54) ALUMINIUM ALLOY MULTI-LAYERED BRAZING SHEET MATERIAL FOR FLUX-FREE BRAZING

(71) Applicant: Novelis Koblenz GmbH, Koblenz (DE)

(72) Inventors: Bernd Jacoby, Limburg (DE); Steven Kirkham, Ransbach-Baumbach (DE); Fabian Ritz, Ötzingen (DE); Axel Alexander Maria Smeyers, Heist op den Berg (BE)

(73) Assignee: Novelis Koblenz GmbH, Koblenz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/000,000

(22) PCT Filed: Jun. 15, 2021

(86) PCT No.: PCT/IB2021/055264
§ 371 (c)(1),
(2) Date: Nov. 28, 2022

(87) PCT Pub. No.: WO2021/255638
PCT Pub. Date: Dec. 23, 2021

(65) Prior Publication Data
US 2023/0211440 A1 Jul. 6, 2023

(30) Foreign Application Priority Data
Jun. 16, 2020 (EP) ..................... 20180172

(51) Int. Cl.
B23K 35/02 (2006.01)
B23K 1/00 (2006.01)
(Continued)

(52) U.S. Cl.
CPC ........ *B23K 35/0238* (2013.01); *B23K 1/0012* (2013.01); *B23K 35/286* (2013.01);
(Continued)

(58) Field of Classification Search
CPC ............ B23K 2103/10; B23K 2101/14; B23K 35/0238; B23K 35/286; B23K 35/383;
(Continued)

(56) References Cited

U.S. PATENT DOCUMENTS 4,161,553 A 7/1979 Vernam et al.
2004/0238605 A1 12/2004 Nishimura et al.
(Continued)

FOREIGN PATENT DOCUMENTS

CN 1832825 A 9/2006
CN 106476359 A 3/2017
(Continued)

OTHER PUBLICATIONS

Smiths, "3003 Aluminum, Technical Datasheet" (2023, no month), downloaded from www.smithmetal.com on Jun. 14, 2024 (1 page). (Year: 2023).*
(Continued)

*Primary Examiner* — Michael E. La Villa
(74) *Attorney, Agent, or Firm* — Kilpatrick Townsend & Stockton LLP (57) ABSTRACT

Described herein is an aluminium alloy multi-layered brazing sheet product for brazing in an inert-gas atmosphere without a flux that includes a core layer made of a 3xxx alloy that includes <0.2 wt. % Mg, and that provides a covering clad layer that includes 2-6 wt. % Si on one or both sides of said 3xxx alloy core layer and a Al—Si brazing clad layer that includes 7-13 wt. % Si positioned between the 3xxx alloy core layer and the covering clad layer, wherein the covering clad layer has a thickness $X_1$ and the Al—Si
(Continued)

brazing clad layer has a thickness $X_2$ and wherein $X_2 \geq 2X_1$. Also described herein is the use of an aluminium alloy multi-layered brazing sheet product in a flux-free controlled atmosphere brazing (CAB) operation to produce a heat exchanger apparatus.

18 Claims, 2 Drawing Sheets

(51) Int. Cl.
| | |
|---|---|
| *B23K 35/28* | (2006.01) |
| *B23K 35/38* | (2006.01) |
| *B32B 15/01* | (2006.01) |
| *B32B 15/04* | (2006.01) |
| *B32B 15/20* | (2006.01) |
| *C22C 21/00* | (2006.01) |
| *C22C 21/02* | (2006.01) |
| *C22C 21/04* | (2006.01) |
| *C22C 21/12* | (2006.01) |
| *C22C 21/14* | (2006.01) |
| *C22C 21/16* | (2006.01) |
| *C22C 21/18* | (2006.01) |
| *B23K 101/14* | (2006.01) |
| *B23K 103/10* | (2006.01) |

(52) U.S. Cl.
CPC .......... *B23K 35/383* (2013.01); *B32B 15/016* (2013.01); *B32B 15/04* (2013.01); *B32B 15/043* (2013.01); *B32B 15/20* (2013.01); *C22C 21/00* (2013.01); *C22C 21/02* (2013.01); *C22C 21/04* (2013.01); *C22C 21/12* (2013.01); *C22C 21/14* (2013.01); *C22C 21/16* (2013.01); *C22C 21/18* (2013.01); *B23K 2101/14* (2018.08); *B23K 2103/10* (2018.08); *Y10T 428/12736* (2015.01); *Y10T 428/12764* (2015.01); *Y10T 428/24942* (2015.01); *Y10T 428/2495* (2015.01); *Y10T 428/24959* (2015.01)

(58) Field of Classification Search
CPC ..... B23K 1/0012; B32B 15/016; B32B 15/04; B32B 15/043; B32B 15/20; C22C 21/00; C22C 21/02; C22C 21/04; C22C 21/12; C22C 21/14; C22C 21/16; C22C 21/18; Y10T 428/12764; Y10T 428/12736; Y10T 428/24942; Y10T 428/2495; Y10T 428/24959

See application file for complete search history.

(56) References Cited

U.S. PATENT DOCUMENTS

| | | | |
|---|---|---|---|
| 2007/0204935 A1 | 9/2007 | Safrany et al. | |
| 2010/0151273 A1* | 6/2010 | Wittebrood | C22C 21/02 428/650 |
| 2011/0290458 A1 | 12/2011 | Gruenenwald et al. | |
| 2015/0037607 A1 | 2/2015 | Itoh et al. | |
| 2015/0053751 A1 | 2/2015 | Eckhard et al. | |
| 2016/0325367 A1 | 11/2016 | Eckhard et al. | |
| 2018/0200842 A1* | 7/2018 | Itoh | B23K 35/22 |
| 2023/0049185 A1* | 2/2023 | Jacoby | B32B 15/016 |

FOREIGN PATENT DOCUMENTS

| | | |
|---|---|---|
| CN | 106573345 A | 4/2017 |
| CN | 108568617 A | 9/2018 |
| EP | 2477783 B1 | 12/2014 |
| EP | 3563968 A1 | 11/2019 |
| FR | 3074717 A1 * | 6/2019 |
| JP | 2006176852 A | 7/2006 |
| JP | 2012236201 A | 12/2012 |
| JP | 2015058466 A | 3/2015 |
| WO | 2004112992 A2 | 12/2004 |
| WO | 2008155067 A1 | 12/2008 |
| WO | 2010000666 A1 | 1/2010 |
| WO | 2011034496 A2 | 3/2011 |
| WO | 2018184806 A1 | 10/2018 |
| WO | 2019115422 A1 | 6/2019 |
| WO | 2021152455 A1 | 8/2021 |

OTHER PUBLICATIONS

Machine Translation, Yanagawa, JP 2012-236201 A, Dec. 6, 2012. (Year: 2012).*
Atlas Steels, "Aluminum Alloy Data Sheet 3003", downloaded from www.atlassteels.com.au on Nov. 16, 2024, three pages, 2013 (no month). (Year: 2013).*
Machine Translation, Chehab Bechir, et al., FR 3074717 A1, Jun. 14, 2019. (Year: 2019).*
European Application No. 21732580.2 , "Office Action", Nov. 23, 2023, 6 pages.
Japanese Application No. 2022-566689 , "Office Action", Dec. 19, 2023, 16 pages.
European Application No. 20180172.7 , "Extended European Search Report", Oct. 27, 2020, 10 pages.
International Application No. PCT/IB2021/055264, "International Search Report and Written Opinion", Oct. 12, 2021, 13 pages.
European Application No. 21732580.2 , "Intention to Grant", Jul. 9, 2024, 7 pages.
Japanese Application No. 2022-566689 , "Office Action", Jun. 11, 2024, 5 pages.
Korean Application No. 10-2022-7036908 , "Office Action", Sep. 19, 2024, 16 pages.
Canadian Application No. 3,181,199 , "Office Action", Apr. 12, 2024, 3 pages.
Korean Application No. 10-2022-7036908, "Notice of Decision to Grant", May 22, 2025, 5 pages.
"Heat Exchanger Aluminum", Aleris, Available Online at: http://imstur.com/img/sTa26pja.pdf, Jan. 1, 2014, 12 pages.
"Machine Translation of CN 106476359A", Mar. 8, 2017, 37 pages.
"Machine Translation of JP 2012236201A", Dec. 6, 2012, 29 pages.
Brazilian Application No. 112022021683-1, "Office Action", Oct. 14, 2025, 5 pages.
Canadian Application No. 3, 181, 199, "Notice of Allowance", Aug. 28, 2025, 1 page.
European Application No. 21732580.2, "Notice of Opposition", Sep. 18, 2025, 17 pages.
European Application No. 21732580.2, "Notice of Opposition", Sep. 30, 2025, 2 pages.
CN202180043046.X, "Office Action", Nov. 21, 2025, 14 pages.
EP20180172.7, "Office Action", Oct. 22, 2025, 5 pages.

* cited by examiner

ALUMINIUM ALLOY MULTI-LAYERED BRAZING SHEET MATERIAL FOR FLUX-FREE BRAZING

CROSS-REFERENCE TO RELATED APPLICATION

This application claims the benefit of and priority to European Patent Application No. 20180172.7, filed Jun. 16, 2020, the contents of which are herein incorporated by reference in its entirety.

FIELD

Described herein is an aluminium alloy multi-layered brazing sheet product or material for brazing in an inert gas atmosphere without a flux ("CAB"), comprising a core layer made of a 3xxx alloy and provided with a covering clad layer on one or both sides of the core layer and an Al—Si brazing clad layer comprising 7-13 wt. % Si positioned between the core layer and the covering clad layer. Also described herein is a brazed assembly manufactured in a brazing operation, the brazed assembly comprising various components and at least one component being made from the aluminium alloy multi-layered brazing sheet material according to this disclosure.

BACKGROUND

Substrates of aluminium or aluminium alloy in the form of sheet or extrusion, are used to make shaped or formed products. In some of these processes, parts of (shaped) aluminium comprising substrates are interconnected. One end of a substrate may be interconnected with the other end or one substrate may be assembled with one or more other substrates. This is commonly done by brazing. In a brazing process, a brazing filler metal or brazing alloy or a composition producing a brazing alloy upon heating is applied to at least one portion of the substrate to be brazed. After the substrate parts are assembled, they are heated until the brazing filler metal or brazing alloy melts. The melting point of the brazing material is lower than the melting point of the aluminium substrate or aluminium core sheet.

Brazing sheet products find wide applications in heat exchangers and other similar equipment. Conventional brazing products have a core of rolled sheet, typically, but not exclusively an aluminium alloy of the 3xxx-series, having on at least one surface of the core sheet an aluminium brazing clad layer (also known as an aluminium cladding layer). The aluminium brazing clad layer is made of a 4xxx-series alloy comprising silicon as its main alloying constituent in an amount in the range of 4-20 wt. %. The aluminium brazing clad layer may be coupled or bonded to the aluminium core alloy in various ways known in the art, for example by means of roll bonding, cladding spray-forming or semi-continuous or continuous casting processes.

These aluminium brazing clad layers have a liquidus temperature typically in the range of about 540-620° C. and below the solidus temperature of the aluminium core alloy. Most brazing is done at temperatures between 560° C. and 615° C.

SUMMARY

Covered embodiments of the present disclosure are defined by the claims, not this summary. This summary is a high-level overview of various aspects of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein is an aluminium alloy multi-layered brazing sheet product for brazing in an inert-gas atmosphere without a flux comprising a core layer made of a 3xxx alloy comprising <0.20 wt. % Mg, and provided with a covering clad layer comprising 2 wt. % to 6 wt. % Si on one or both sides of said 3xxx alloy core layer and a Al—Si brazing clad layer comprising 7 wt. % to 13 wt. % Si positioned between the 3xxx alloy core layer and the covering clad layer, wherein the covering clad layer has a thickness $X_1$ and the Al—Si brazing clad layer has a thickness $X_2$ and wherein $X_2 \geq 2X_1$.

Optionally, the 3xxx alloy core layer comprises up to 0.1% Mg. Optionally, the covering clad layer is Bi-free and Li-free. Optionally, the covering clad layer is Mg-free, Bi-free and Li-free, and comprises, in wt. %:

Si 2% to 6%, preferably 2.5% to 5%, more preferably 3.5% to 5.0%;
Fe up to 0.5%;
Mn up to 0.2%;
Cu up to 0.1%;
Zn up to 0.4%;
Ti up to 0.1%;
inevitable impurities, each <0.05%, total <0.15%, balance aluminium.

Optionally, the 3xxx alloy core layer comprises, in wt. %,
0.5% to 1.8% Mn;
<0.20% Mg;
up to 1.1% Cu;
up to 0.7% Si;
up to 0.7% Fe;
up to 0.3% Cr;
up to 0.3% Sc;
up to 0.3% Zr and/or V;
up to 0.25% Ti;
up to 1.7% Zn;
unavoidable impurities each up to 0.05% and total up to 0.2%, and balance aluminium.

Optionally, the 3xxx alloy core layer has a Cu content up to 0.15%. Optionally, the 3xxx alloy core layer has a Cu content in the range of 0.15% to 1.1%, and preferably in the range of 0.20% to 0.9%. Optionally, the Al—Si brazing clad layer comprises, in wt. %,
Si 7%-13%, and preferably 10%-13%;
Mg up to 0.5%, and preferably 0.02% to 0.5%;
Fe up to 0.7%;
Cu up to 0.3%;
Mn up to 0.8%;
Zn up to 2%;
Bi up to 0.3%, and preferably 0.06% to 0.3%;
Ti up to 0.25%;
balance aluminium and unavoidable impurities each <0.05%, total <0.2%.

Optionally, the multi-layered brazing sheet is surface treated with an alkaline or acidic etchant before a brazing step. Optionally, the covering clad layer has a thickness $X_1$ and the Al—Si brazing clad layer has a thickness $X_2$ and wherein $X_2 \geq 2.5 X_1$, and preferably $X_2 \geq 3 X_1$. Optionally, at least one of the core layer, the Al—Si brazing clad layer, or the covering clad layer comprises at least 0.05 wt. % Ti.

Also described herein is a process for the production of a braze heat exchanger, comprising the steps of providing at least one aluminium alloy multi-layered brazing sheet product, such as the above-described multi-layered brazing sheet product, and preferably the multi-layered brazing sheet is surface treated with an alkaline or acidic etchant before a brazing step; and brazing in a flux-free controlled atmosphere brazing (CAB).

Also described herein is the use of an aluminium alloy multi-layered brazing sheet product, such as the above-described multi-layered brazing sheet product, in a flux-free controlled atmosphere brazing (CAB) operation to produce a heat exchanger apparatus.

Other objects and advantages of the present disclosure will be apparent from the following detailed description of non-limiting examples and drawings.

DETAILED DESCRIPTION

As will be appreciated herein below, except as otherwise indicated, aluminium alloy designations and temper designations refer to the Aluminium Association designations in Aluminium Standards and Data and the Registration Records, as published by the Aluminium Association in 2019, and frequently updated, and are well known to the person skilled in the art. The temper designations are laid down in European standard EN515.

For any description of alloy compositions or preferred alloy compositions, all references to percentages are by weight percent unless otherwise indicated.

The term "up to" and "up to about", as employed herein, explicitly includes, but is not limited to, the possibility of zero weight-percent of the particular alloying element to which it refers. For example, up to about 0.3% Cr may include an aluminium alloy having no Cr.

As used herein, the meaning of "a," "an," or "the" includes singular and plural references unless the context clearly dictates otherwise.

As used herein, a plate generally has a thickness of greater than about 15 mm. For example, a plate may refer to an aluminium product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminium product having a thickness of less than about 4 mm. For example, a sheet may have a thickness of less than about 4 mm, less than about 3 mm, less than about 2 mm, less than about 1 mm, less than about 0.5 mm, less than about 0.3 mm, or less than about 0.1 mm.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

Provided herein is an improved brazing sheet product for brazing in an inert gas atmosphere without a flux.

Specifically, provided herein is an aluminium alloy multi-layered brazing sheet product for brazing in an inert-gas atmosphere without a flux, comprising a core layer made of a 3xxx alloy comprising <0.20 wt. % Mg, and provided with a covering clad layer comprising 2-6 wt. % Si on one or both sides of said 3xxx alloy core layer and a Al—Si brazing clad layer comprising 7-13 wt. % Si positioned between the 3xxx alloy core layer and the covering clad layer, wherein the covering clad layer has a thickness $X_1$ and the Al—Si brazing clad layer has a thickness $X_2$ and wherein $X_2 \geq 2X_1$.

Optionally, at least one of the core layer, Al—Si brazing clad layer, or covering clad layer includes Ti (e.g., at least 0.05 wt. % Ti or greater than 0.05 wt. % Ti). In other words, in some examples, Ti is intentionally added to at least one of the core layer, Al—Si brazing clad layer, or covering clad layer.

The 3xxx alloy core layer comprises <0.20% Mg, preferably up to 0.1% Mg, and more preferably up to 0.05% Mg (e.g., from 0% to less than 0.20%, from 0.025% to less than 0.20%, from 0.05% to less than 0.20%, from 0.075% to less than 0.20%, from 0.10% to less than 0.20%, from 0.125% to less than 0.20%, from 0.15% to less than 0.20%, or from 0.175% to less than 0.20%). Optionally, the Mg content of the core layer can be about 0.01%, about 0.02%, about 0.03%, about 0.04%, about 0.05%, about 0.06%, about 0.07%, about 0.08%, about 0.09%, about 0.1%, about 0.11%, about 0.12%, about 0.13%, about 0.14%, about 0.15%, about 0.16%, about 0.17%, about 0.18%, or about 0.19%.

In accordance with the present disclosure, it has been found that the thin covering layer has a liquidus temperature substantially higher than the liquidus temperature of the Al—Si brazing clad layer so that the molten brazing material during a subsequent brazing operation at a temperature above the liquidus temperature of the Al—Si alloy brazing clad layer and below the liquidus temperature of the thin covering clad layer is to cause said Al—Si alloy brazing clad layer to melt down while keeping said thin covering clad layer partially solid to prevent or at least limit oxidation of the brazing material being melted, and then cause the Al—Si alloy brazing material to seep, due to volumetric expansion, through segregation portions of said thin covering clad layer onto a surface of said thin covering clad layer and spread over the surface of said thin covering clad layer to form an emerging surface resulting in a brazed joint. The covering clad layer will eventually dissolve into the molten filler material. A high difference in the Si content of the thin covering layer and the Al—Si brazing clad layer is to create a difference in liquidus temperature. If the difference in the Si content is too low the oxidation protection layer effect is too low, and Si will start to diffuse from the Al—Si brazing clad layer to the thin covering layer during the heat-up cycle to brazing temperature.

The Si content of the covering clad layer can be from about 2% to 6% (e.g., from 2.25% to 6%, from 2.5% to 6%, from 2.75% to 6%, from 3% to 6%, from 3.25% to 6%, from 3.5% to 6%, from 3.75% to 6%, from 4% to 6%, from 4.25% to 6%, from 4.5% to 6%, from 4.75% to 6%, from 5% to 6%, from 5.25% to 6%, from 5.5% to 6%, or from 5.75% to 6%). Optionally, the Si content of the covering clad layer can be about 2%, about 2.25%, about 2.5%, about 2.75%, about 3%, about 3.25%, about 3.5%, about 3.75%, about 4%, about 4.25%, about 4.5%, about 4.75%, about 5%, about 5.25%, about 5.5%, about 5.75%, or about 6%.

The Si content of the brazing clad layer can be from about 7% to 13% (e.g., from 7.25% to 13%, from 7.5% to 13%, from 7.75% to 13%, from 8% to 13%, from 8.25% to 13%, from 8.5% to 13%, from 8.75% to 13%, from 9% to 13%, from 9.25% to 13%, from 9.5% to 13%, from 9.75% to 13%, from 10% to 13%, from 10.25% to 13%, from 10.5% to 13%, from 10.75% to 13%, from 11% to 13%, from 11.25% to 13%, from 11.5% to 13%, from 11.75% to 13%, from 12% to 13%, from 12.25% to 13%, from 12.5% to 13%, or from 12.75% to 13%). Optionally, the Si content of the brazing clad layer can be about 7%, about 7.25%, about 7.5%, about 7.75%, about 8%, about 8.25%, about 8.5%, about 8.75%, about 9%, about 9.25%, about 9.5%, about 9.75%, about 10%, about 10.25%, about 10.5%, about 10.75%, about 11%, about 11.25%, about 11.5%, about 11.75%, about 12%, about 12.25%, about 12.5%, about 12.75% or about 13%.

An important advantage of having a low Mg content in the aluminium core alloy layer is the compatibility with this approach in CAB furnaces that are also used with fluxed components in a heat exchanger to be brazed. There is no need for separate equipment for flux-free brazing. The Mg content in the aluminium core alloy can be from 0% to 0.2% (e.g., from 0.025% to 0.2%, from 0.05% to 0.2%, from 0.075% to 0.2%, from 0.1% to 0.2%, from 0.125% to 0.2%, from 0.150% to 0.2%, or from 0.175% to 0.2%). Optionally, the Mg content of the aluminium core alloy can be about 0.025%, about 0.05%, about 0.075%, about 0.1%, about 0.125%, about 0.150%, about 0.175%, or about 0.2%.

In an embodiment, the aluminium core alloy layer is made from a 3XXX-series aluminium alloy consisting of, in wt. %:
- 0.5% to 1.8% Mn, preferably 0.6% to 1.5%, and more preferably 0.8% to 1.3%;
- <0.20% Mg, preferably up to 0.1%, and more preferably up to 0.05%;
- up to 1.1% Cu, and preferably up to 0.15% or alternatively in a range of 0.15% to 1.1%, and preferably 0.20% to 0.95%, and more preferably 0.20% to 0.60%;
- up to 0.7% Si, and preferably up to 0.3% or alternatively in a range of 0.3% to 0.7% and more preferably of 0.40% to 0.65%;
- up to 0.7% Fe, preferably up to 0.5%, and more preferably in a range of 0.05% to 0.35%;
- up to 0.3% Cr, preferably up to 0.20%, and more preferably up to 0.09%, and most preferably up to 0.04%;
- up to 0.3% Sc, preferably up to 0.25%;
- up to 0.3% Zr and/or V, preferably up to 0.09%, and more preferably up to 0.04%;
- up to 0.25% Ti, preferably 0.01% to 0.20%, more preferably 0.01% to 0.12%;
- up to 1.7% Zn, preferably up to 1.2% Zn, more preferably up to 0.5%, and most preferably up to 0.2%;
- balance aluminium and impurities. Typically impurities are each up to 0.05% maximum and in total 0.2% maximum, and preferably in total not exceeding 0.15%.

The Mn content in the aluminium core alloy layer can be from 0.5% to 1.8% (e.g., from 0.6% to 1.5%, or from 0.8% to 1.3%). Optionally, the Mn content in the aluminium core alloy layer can be about 0.5%, about 0.55%, about 0.6%, about 0.65%, about 0.7%, about 0.75%, about 0.8%, about 0.85%, about 0.9%, about 0.95%, about 1%, about 1.05%, about 1.1%, about 1.15%, about 1.2%, about 1.25%, about 1.3%, about 1.35%, about 1.4%, about 1.45%, about 1.5%, about 1.55%, about 1.6%, about 1.65%, about 1.7%, about 1.75%, or about 1.8%.

The Mg content of the aluminium core alloy layer can be from 0% to less than 0.20% (e.g., from 0.02% to less than 0.20%, from 0.04% to less than 0.20%, from 0.06% to less than 0.20%, from 0.08% to less than 0.20%, from 0.10% to less than 0.20%, from 0.12% to less than 0.20%, from 0.14% to less than 0.20%, from 0.16% to less than 0.20%, or from 0.18% to less than 0.20%). Optionally, the Mg content of the aluminium core alloy layer can be about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, or about 0.19%.

The Cu content of the aluminium core alloy layer can be from 0% to 1.10% (e.g., from 0.15% to 1.1%, from 0.20% to 0.95%, or from 0.20% to 0.60%). Optionally, the Cu content of the aluminium core alloy layer can be 0%, about 0.05%, about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.00%, about 1.05%, or about 1.10%.

The Si content of the aluminium core alloy layer can be from 0% to 0.7% (e.g., from 0.1% to 0.7%, from 0.2% to 0.7%, from 0.3% to 0.7%, from 0.4% to 0.7%, from 0.5% to 0.7%, from 0.6% to 0.7%, from 0% to 0.3%, or from 0.4% to 0.65%). Optionally, the Si content of the aluminium core alloy layer can be 0%, about 0.025%, about 0.05%, about 0.075%, about 0.10%, about 0.125%, about 0.15%, about 0.175%, about 0.20%, about 0.225%, about 0.25%, about 0.275%, about 0.30%, about 0.325%, about 0.35%, about 0.375%, about 0.40%, about 0.425%, about 0.45%, about 0.475%, about 0.50%, about 0.525%, about 0.55%, about 0.575%, about 0.60%, about 0.625%, about 0.65%, about 0.675%, or about 0.70%.

The Fe content of the aluminium core alloy layer can be from 0% to 0.7% (e.g., from 0.1% to 0.7%, from 0.2% to 0.7%, from 0.3% to 0.7%, from 0.4% to 0.7%, from 0.5% to 0.7%, from 0.6% to 0.7%, from 0% to 0.50%, or from 0.05% to 0.35%). Optionally, the Fe content of the aluminium core alloy layer can be 0%, about 0.025%, about 0.05%, about 0.075%, about 0.10%, about 0.125%, about 0.15%, about 0.175%, about 0.20%, about 0.225%, about 0.25%, about 0.275%, about 0.30%, about 0.325%, about 0.35%, about 0.375%, about 0.40%, about 0.425%, about 0.45%, about 0.475%, about 0.50%, about 0.525%, about 0.55%, about 0.575%, about 0.60%, about 0.625%, about 0.65%, about 0.675%, or about 0.70%.

The Cr content of the aluminium core alloy layer can be from 0% to 0.30% (e.g., from 0.05% to 0.30%, from 0.10% to 0.30%, from 0.15% to 0.30%, from 0.20% to 0.30%, from 0.25% to 0.30%, from 0% to 0.20%, from 0% to 0.09%, or from 0% to 0.04%). The Cr content of the aluminium core alloy layer can be 0%, about 0.025%, about 0.05%, about 0.075%, about 0.10%, about 0.125%, about 0.15%, about 0.175%, about 0.20%, about 0.225%, about 0.25%, about 0.275%, or about 0.30%.

The Sc content of the aluminium core alloy layer can be from 0% to 0.30% (e.g., from 0.05% to 0.30%, from 0.10% to 0.30%, from 0.15% to 0.30%, from 0.20% to 0.30%, from 0.25% to 0.30%, or from 0% to 0.25%). Optionally, the Sc content of the aluminium core alloy layer can be 0%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17/q, about 0.18%, about 0.19%, about 0.20%, about 0.21%, about 0.22%, about 0.23%, about 0.24%, about 0.25%, about 0.26%, about 0.27%, about 0.28%, about 0.29%, or about 0.30%.

The Zr and/or V content of the aluminium core alloy layer can each be from 0% to 0.30% (e.g., from 0.05% to 0.30%, from 0.10% to 0.30%, from 0.15% to 0.30%, from 0.20% to 0.30%, from 0.25% to 0.30%, from 0% to 0.09%, or from 0% to 0.04%). Optionally, the Zr and/or V content of the aluminium core alloy layer can be 0%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, or about 0.30%.

The Ti content of the aluminium core alloy layer can be from 0% to 0.25% (e.g., from 0.05% to 0.25%, from 0.10% to 0.25%, from 0.15% to 0.25%, from 0.20% to 0.25%, from 0.01% to 0.20%, or from 0.01% to 0.12%). Optionally, the Ti content of the aluminium core alloy layer can be 0%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, or about 0.25%.

The Zn content of the aluminium core alloy layer can be from 0% to 1.7% (e.g., from 0.25% to 1.7%, from 0.50% to 1.7%, from 0.75% to 1.7%, from 1.0% to 1.7%, from 1.25% to 1.7%, from 1.5% to 1.7%, from 0% to 1.2%, from 0% to 0.50%, or from 0% to 0.20%). Optionally, the Zn content of the aluminium core alloy layer can be 0%, about 0.05%, about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.00%, about 1.05%, about 1.10%, about 1.15%, about 1.20%, about 1.25%, about 1.30%, about 1.35%, about 1.40%, about 1.45%, about 1.50%, about 1.55%, about 1.60%, about 1.65%, or about 1.70%.

In an embodiment, the covering clad layer is free of wetting elements or elements modifying the surface tension of a molten Al—Si alloy, selected from the group of Ag, Be, Bi, Ca, Ce, La, Li, Na, Pb, Se, Sb, Sr, Th, and Y. With "free" is meant that no purposeful addition of Ag, Be, Bi, Ca, Ce, La, Li, Na, Pb, Se, Sb, Sr, Th, or Y is made to the chemical composition but that due to impurities and/or leaking from contact with manufacturing equipment, trace quantities of may nevertheless find their way into the covering material layer. In practice this means that the amount present of each of these defined elements, if present, is up to about 0.005%, typically less than about 0.001%. In an embodiment the sum of these wetting elements does not exceed 0.01%, and preferably does not exceed 0.005%. For example, less than 10 ppm Sr, and preferably less than 5 ppm Sr, is an example of a trace quantity. Also, less than 10 ppm Na, and preferably less than 3 ppm Na is another example of a trace quantity. The avoidance of wetting elements, for example an element like Bi, is important as it reduces the occurrence of edge cracking during liner production. The presence of wetting elements would limit also the positive effect of preventing the surface from re-oxidation during brazing by having a partially melted covering clad or top layer as it might flow too easy should a wetting element be present.

The covering clad layer is preferably free from Mg, meaning that the level is below about 0.05%, preferably below about 0.03%, and more preferably below 0.01%. With "free" is meant that no purposeful addition of Mg is made to the chemical composition but that due to impurities and/or leaking from contact with manufacturing equipment, trace quantities of may nevertheless find their way into the covering material layer.

In an embodiment, the covering clad layer is a Mg-free aluminium alloy and comprising, in wt. %,
Si 2% to 6%, preferably 2.5% to 5%, more preferably 3.5% to 5.0%;
Fe up to 0.5%, preferably up to 0.3%;
Mn up to 0.2%, preferably up to 0.10%;
Cu up to 0.1%, preferably up to 0.05%;
Zn up to 0.4%, preferably up to 0.2%;
Ti up to 0.1%, preferably up to 0.05%;
inevitable impurities, each <0.05%, total <0.15%, and preferably each <0.02% and
total <0.05%, balance aluminium.

The Si content of the covering clad layer can be from 2% to 6% (e.g., from 2.5% to 6%, from 3% to 6%, from 3.5% to 6%, from 4% to 6%, from 4.5% to 6%, from 5% to 6%, from 5.5% to 6%, from 2.5% to 5%, or from 3.5% to 5%). Optionally, the Si content of the covering clad layer can be about 2%, about 2.25%, about 2.5%, about 2.75%, about 3%, about 3.25%, about 3.5%, about 3.75%, about 4%, about 4.25%, about 4.5%, about 4.75%, about 5%, about 5.25%, about 5.75%, or about 6%.

The Fe content of the covering clad layer can be from 0% to 0.5% (e.g., from 0.1% to 0.5%, from 0.2% to 0.5%, from 0.3% to 0.5%, from 0.4% to 0.5%, or from 0% to 0.3%). Optionally, the Fe content of the covering clad layer can be 0%, about 0.025%, about 0.05%, about 0.075%, about 0.1%, about 0.125%, about 0.15%, about 0.175%, about 0.2%, about 0.225%, about 0.25%, about 0.275%, about 0.3%, about 0.325%, about 0.35%, about 0.375%, about 0.4%, about 0.425%, about 0.45%, about 0.475%, or about 0.5%.

The Mn content of the covering clad layer can be from 0% to 0.2% (e.g., from 0.05% to 0.2%, from 0.1% to 0.2%, from 0.15% to 0.2%, or from 0% to 0.1%). Optionally, the Mn content of the covering clad layer can be 0%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, or about 0.20%.

The Cu content of the covering clad layer can be from 0% to 0.10% (e.g., from 0.025% to 0.10%, from 0.05% to 0.10%, from 0.075% to 0.10%, or from 0% to 0.05%). Optionally, the Cu content of the covering clad layer can be 0%, about 0.01%, about 0.02%, about 0.03%, about 0.04%, about 0.05%, about 0.06%, about 0.07%, about 0.08%, about 0.09%, or about 0.10%.

The Zn content of the covering clad layer can be from 0% to 0.40% (e.g., from 0.05% to 0.40%, from 0.10% to 0.40%, from 0.15% to 0.40%, from 0.20% to 0.40%, from 0.25% to 0.40%, from 0.30% to 0.40%, from 0.35% to 0.40%, or from 0% to 0.20%). Optionally, the Zn content of the covering clad layer can be 0%, about 0.02%, about 0.04%, about 0.06%, about 0.08%, about 0.10%, about 0.12%, about 0.14%, about 0.16%, about 0.18%, about 0.20%, about 0.22%, about 0.24%, about 0.26%, about 0.28%, about 0.30%, about 0.32%, about 0.34%, about 0.36%, about 0.38%, or about 0.40%.

The Ti content of the covering clad layer can be from 0% to 0.10% (e.g., from 0.025% to 0.10%, from 0.05% to 0.10%, from 0.075% to 0.10%, or from 0% to 0.05%). Optionally, the Ti content of the covering clad layer can be 0%, about 0.01%, about 0.02%, about 0.03%, about 0.04%, about 0.05%, about 0.06%, about 0.07%, about 0.08%, about 0.09%, or about 0.10%.

In an embodiment the covering clad layer is a Mg-free aluminium alloy consisting of, in wt. %, Si 2% to 6%, Fe up to 0.5%, Mn up to 0.2%, Cu up to 0.1%, Zn up to 0.4%, Ti up to 0.1%, inevitable impurities, each <0.05% and total <0.15%, balance aluminium, and with preferred narrower ranges as herein described and claimed.

In an embodiment of the present disclosure, the Al—Si brazing clad layer has the following composition, comprising of, in wt. %, Si 7%-13%, preferably 10%-13%, more preferably 11%-13%;
Mg up to 0.5%, preferably 0.02% to 0.5%, and more preferably 0.02% to 0.3%, and most preferably 0.10% to 0.20%;
Fe up to 0.7%, preferably up to 0.5%;
Cu up to 0.3%, preferably up to 0.1%;
Mn up to 0.8%, preferably up to 0.2%;
Zn up to 2%, preferably up to 0.3%;
Ti up to 0.25%, preferably up to 0.15%, and more preferably up to 0.1%;
balance aluminium, and unavoidable impurities each <0.05%, total <0.2%.

The Si content of the Al—Si brazing clad layer can be from 7% to 13% (e.g., from 8% to 13%, from 9% to 13%, from 10% to 13%, from 11% to 13%, or from 12% to 13%). Optionally, the Si content of the brazing clad layer can be about 7%, about 7.25%, about 7.5%, about 7.75%, about 8%, about 8.25%, about 8.5%, about 8.75%, about 9%, about 9.25%, about 9.5%, about 9.75%, about 10%, about 10.25%, about 10.5%, about 10.75%, about 11%, about 11.25%, about 11.5%, about 11.75%, about 12%, about 12.25%, about 12.5%, about 12.75%, or about 13%.

The Mg content of the Al—Si brazing clad layer can be from 0% to 0.5% (e.g., from 0.02% to 0.5%, from 0.02% to 0.3%, or from 0.1% to 0.2%). Optionally, the Mg content of the brazing clad layer can be about 0.02%, about 0.04%, about 0.06%, about 0.08%, about 0.1%, about 0.12%, about 0.14%, about 0.16%, about 0.18%, about 0.2%, about 0.22%, about 0.24%, about 0.26%, about 0.28%, about 0.3%, about 0.32%, about 0.34%, about 0.36%, about 0.38%, about 0.4%, about 0.42%, about 0.44%, about 0.46%, about 0.48%, or about 0.5%.

The Fe content of the Al—Si brazing clad layer can be from 0% to 0.7% (e.g., from 0.1% to 0.7%, from 0.2% to 0.7%, from 0.3% to 0.7%, from 0.4% to 0.7%, from 0.5% to 0.7%, from 0.6% to 0.7%, or from 0% to 0.5%). Optionally, the Fe content of the brazing clad layer can be about 0.025%, about 0.05%, about 0.075%, about 0.1%, about 0.125%, about 0.15%, about 0.175%, about 0.2%, about 0.225%, about 0.25%, about 0.275%, about 0.3%, about 0.325%, about 0.35%, about 0.375%, about 0.4%, about 0.425%, about 0.45%, about 0.475%, about 0.5%, about 0.525%, about 0.55%, about 0.575%, or about 0.6%, about 0.625%, about 0.65%, about 0.675%, or about 0.7%.

The Cu content of the Al—Si brazing clad layer can be from 0% to 0.30% (e.g., from 0.05% to 0.30%, from 0.10% to 0.30%, from 0.15% to 0.30%, from 0.20% to 0.30%, from 0.25% to 0.30%, or from 0% to 0.10%). Optionally, the Cu content of the brazing clad layer can be 0%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, or about 0.30%.

The Mn content of the Al—Si brazing clad layer can be from 0% to 0.80% (e.g., from 0.10% to 0.80%, from 0.20% to 0.80%, from 0.30% to 0.80%, from 0.40% to 0.80%, from 0.50% to 0.80%, from 0.60% to 0.80%, from 0.70% to 0.80%, or from 0% to 0.20%). Optionally, the Mn content of the brazing clad layer can be 0%, about 0.05%, about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, or about 0.80%.

The Zn content of the Al—Si brazing clad layer can be from 0% to 2% (e.g., from 0.25% to 2%, from 0.50% to 2%, from 0.75% to 2%, from 1.25% to 2%, from 1.5% to 2%, from 1.75% to 2%, or from 0% to 0.30%). Optionally, the Zn content of the brazing clad layer can be 0%, about 0.20%, about 0.30%, about 0.40%, about 0.60%, about 0.80%, about 1.0%, about 1.2%, about 1.4%, about 1.6%, about 1.8%, or about 2.0%.

The Ti content of the Al—Si brazing clad layer can be from 0% to 0.25% (e.g., from 0.05% to 0.25%, from 0.10% to 0.25%, from 0.15% to 0.25%, from 0.20% to 0.25%, from 0% to 0.15%, or from 0% to 0.10%). Optionally, the Ti content of the aluminium core alloy layer can be 0%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, or about 0.25%.

In a particular embodiment the Al—Si brazing clad layer may further comprise up to 0.3% Bi, preferably 0.06% to 0.3%, more preferably 0.11% to 0.20%, to facilitate the flow of the Al—Si brazing clad layer and to enhance joint formation during brazing.

In an embodiment of the present disclosure, the Al—Si brazing clad layer has the following composition, consisting of, in wt. %, Si 7%-13%, preferably 10%-13%, more preferably 11%-13%;
Mg up to 0.5%, preferably 0.02% to 0.5%, and more preferably 0.02% to 0.3%,
and most preferably 0.10% to 0.20%;
Fe up to 0.7%, preferably up to 0.5%;
Cu up to 0.3%, preferably up to 0.1%;
Mn up to 0.8%, preferably up to 0.2%;
Zn up to 2%, preferably up to 0.3%;

Bi up to 0.3%, preferably 0.06% to 0.3%, more preferably 0.11% to 0.20%;

Ti up to 0.25%, preferably up to 0.15%, and more preferably up to 0.1%;

balance aluminium, and unavoidable impurities each <0.05%, total <0.2%.

In an embodiment of the aluminium alloy multi-layered brazing sheet material according to the present disclosure the 3xxx alloy core layer is provided on both sides with the covering clad layer and the Al—Si brazing clad layer. When both sides of the 3xxx alloy core layer are clad in the same manner, the brazing sheet material consists of a five-layer configuration.

In an embodiment the aluminium alloy multi-layered brazing sheet material is devoid of or free from of an aluminium alloy layer interposed between the 3xxx alloy core layer and the Al—Si brazing clad layer as this would reduce the production yield giving raise the increased product costs.

The aluminium alloy multi-layered brazing sheet material according to present disclosure can be manufactured via various techniques. For example by means of roll bonding as is well known in the art, and which method is preferred. The process may generally comprise the following steps:

casting the different aluminium alloys to obtain rolling blocks;

scalping of the blocks on either side to remove surface segregation zones originating from the casting process and to improve product flatness;

preheating of the brazing material blocks at 400° C. to 550° C.;

hot rolling of the blocks forming the covering layer and the Al—Si brazing clad layer until the desired thickness to provide multiple hot rolled clad liners;

alternatively hot rolling the blocks of the covering layer and the Al—Si brazing clad layer to intermediate thickness and stacking the two materials at intermediate thickness and further hot rolling the stack to provide a hot rolled clad liner of required thickness composed of the two layers;

optionally homogenizing the aluminium core alloy block at 500° C. to 630° C. for at least 1 hour, preferably 1 to 20 hours;

assembling the core alloy block with at least on one face, optionally on both faces, the rolled clad liner(s) to obtain a sandwich;

preheating the sandwich at 400° C. to 550° C.;

hot rolling the sandwich until an intermediate thickness, for example 2 to 10 mm; cold rolling the hot rolled sandwich until the desired final thickness to obtain a multi-layered brazing sheet product; and optionally annealing at 200° C. to 480° C. to obtain a multi-layered brazing sheet product of the desired temper, for example O-temper, H2x-temper or H3x-temper.

Alternatively, on a less preferred basis, one or more of the covering clad layer and the Al—Si brazing clad layer can be applied onto the 3xxx alloy core layer by means of thermal spraying techniques. Or alternatively, the core aluminium alloy layer and the Al—Si alloy brazing clad layer can be manufactured by means of casting techniques, for example as disclosed in patent document WO-2004/112992, where after the covering clad layer can be applied by means of for example roll bonding or thermal spraying techniques.

In an embodiment the aluminium alloy multi-layered brazing sheet material thus obtained is treated with an alkaline or acidic etchant before the brazing process to remove a surface oxide film to facilitate the fluxless CAB brazing operation.

Preferably, the outer-surface of the aluminium alloy multi-layered brazing sheet material is treated with an acidic etchant. The acidic etchant preferably comprises 10 g/L to 25 g/L, more preferably 12 g/L to 16 g/L, for example 14 g/L of $H_2SO_4$ and 0.5 g/L to 5 g/L, more preferably 1 g/L to 3 g/L, for example 2 g/L of HF (5%). The acidic etchant may comprise at least one of the following mineral acids: $H_2SO_4$, $H_3PO_4$, HCl, HF and/or $HNO_3$. Preferably, the acidic etchant is a mixture of $H_2SO_4$ and HF. The acidic etchant is generally in the form of a solution and the mineral acid content is generally from 0.5 to 20 wt. %.

According to another embodiment the etchant may be alkaline. The alkaline etchant may comprise at least one of the following: NaOH and/or KOH. The alkaline etchant is generally in the form of a solution and the alkaline content is generally from 0.5 to 20 wt. %. The alkaline etchant may further comprise surfactants (for example, anionic surfactants such as alkylbenzene sulfonates, alkyl sulfates, alkyl ether sulfates; cationic surfactants such as mono alkyl quaternary systems; non-ionic surfactants such as with ester, ether or amide bonding (for example glycol esters); or amphoteric surfactants such as imidazoline derivatives or polypeptides) or complexing agents (for example sodium gluconate, sorbitol, mucic acid or Arabic gum).

The alkaline etchant generally needs to be rinsed with an acid, for example nitric or sulfuric acid.

The surface treatment with an etchant generally lasts from 1 second to 5 minutes, preferably from 3 seconds to 80 seconds, more preferably from 5 seconds to 50 seconds.

The temperature during this surface treatment is generally from 20° C. to 100° C., preferably from 30° C. to 80° C., more preferably 50° C. to 80° C.

During the surface treatment, the amount of removed aluminium of the clad outer layer side is 1 to 1000 $mg/m^2$ per side, preferably 5 to 500 $mg/m^2$ per side, more preferably 5 to 300 $mg/m^2$ per side.

The aluminium alloy multi-layered brazing sheet material according to the present disclosure has a typical thickness at final gauge in the range of about 0.05 mm to 4 mm, and preferably about 0.2 mm to 2 mm, and more preferably about 0.2 mm to 1.5 mm.

In an embodiment, each covering clad layer has a thickness which is about 0.5% to 10%, preferably 0.5% to 5%, of the entire thickness of the multi-layered brazing sheet, and each Al—Si brazing clad layer has a thickness which is about 3% to 25%, preferably about 4% to 15%, of the entire thickness of the aluminium alloy multi-layered brazing sheet.

In an embodiment, the covering clad layer has a thickness in the range of 4 µm to 80 µm, preferably in a range of 5 µm to 50 µm.

It is important to keep the thickness of the covering clad layer thin compared to the thickness of the Al—Si brazing clad layer. The covering clad layer has a thickness $X_1$ and the Al—Si brazing clad layer has a thickness $X_2$ and the thickness ratio ($X_2$ to $X_1$) of the Al—Si alloy brazing clad layer and the covering clad layer is 2 or more to 1. In an embodiment the thickness ratio is 2.5 or more to 1, and preferably $X_2 \geq 3X_1$, for example the thickness ratio is 2.5 to 1, or 3 to 1, or 3.5 to 1. In some cases, the thickness ratio is represented by $2X_1 < X_2 < 2.5X_1$.

Preferably the total of the thicknesses of the covering clad layer and the Al—Si brazing clad layer applied on a side of the core alloy layer are in a range of about 5% to 25%, preferably 5% to 15%, of the entire thickness of the multi-layered brazing sheet material.

In an embodiment of the present disclosure, the aluminium alloy multi-layered brazing sheet material is provided in an O-temper, and which is fully annealed.

In an embodiment of the present disclosure, the aluminium alloy multi-layered brazing sheet material is provided in a H3x-temper, H2x-temper or H1x-temper, and wherein x is 1, 2, 3, 4, 5, 6, 7 or 8, such as for example the H14, H18, H22, H24 and H26 temper.

As a particular example the aluminium alloy multi-layered brazing sheet material is provided in an H14, H22, H24, or O-temper.

In a further aspect of the present disclosure, it relates to the use of the aluminium alloy multi-layered brazing sheet material or product for the production by means of a flux-free controlled atmosphere brazing (CAB) operation of a heat exchanger, e.g. of a motor vehicle, and as such, the aluminium alloy multi-layered brazing sheet material is suitable for being applied in heat exchangers for powertrain and engine cooling radiators, low temperature radiators, direct air-to-air charge air cooling ("CAC") or intercooling, air-to-water CAC, water-to-air CAC, air-to-refrigerant CAC, refrigerant-to-air CAC, air-to-refrigerant evaporators, air-to-refrigerant condensers, water-to-refrigerant evaporators, water-to-refrigerant condensers, heater cores, exhaust gas cooling, exhaust gas recirculation systems, hybrid cooling system, two-phase cooling systems, oil coolers, fuel coolers, material for battery cooling systems, chillers, cold plates, heat recovery systems, etc.

In a further aspect of the present disclosure there is provided an article comprising at least two formed members, for example formed by means of bending, folding, tube forming or deep drawing, joint to each other in a flux-free controlled atmosphere brazing (CAB) operation, in particular a heat-exchanger of a motor vehicle, incorporating at least the aluminium alloy multi-layered brazing material according to the present disclosure as one of the formed members.

In another aspect of the present disclosure there is provided a method of manufacturing an assembly of brazed components, comprising the steps of, in that order:
  (a) providing or forming the components of which at least one is made from an aluminium alloy multi-layered brazing sheet product as herein set out or claimed; and preferably the multi-layered brazing sheet is treated with an alkaline or acidic etchant;
  (b) assembling the components into an assembly; and preferably one side of the multi-layered brazing sheet of the present disclosure having the covering clad layer is being kept inside the assembly forming the brazing sheet to constitute a structure, preferably a hollow structure;
  (c) brazing the assembly without applying brazing flux in an inert gas atmosphere, e.g. argon or nitrogen, at a brazing temperature, typically at a temperature in a range of about 540° C. to 615° C., for example at about 590° C. or at about 600° C., for a period long enough for melting and spreading of the Al—Si brazing material, for example a dwell time of about 1 to 10 minutes, preferably 1 to 6 minutes, typically at around about 2 or 4 minutes, to form a fillet between the filler material and at least one other component; and wherein the oxygen content of the dry inert gas atmosphere is controlled to a level as low as possible, preferably below 200 ppm, and more preferably below 100 ppm, and more preferably below 40 ppm; and
  (d) cooling of the brazed assembly, typically to below 100° C.; e.g. to ambient temperature.

Ideally, when assembling the components into an assembly suitable for joining by brazing, one side of the multi-layered brazing sheet product of the present disclosure having the thin covering clad layer is being kept inside the assembly forming the brazing sheet to constitute a structure. While using the brazing sheet product according to the present disclosure there is no requirement to apply a brazing flux in order to obtain a good joint following the brazing operation.

In a preferred embodiment the brazing inert gas atmosphere during the brazing operation should be dry, meaning that the dew point is less than minus 40° C., and more preferably of minus 45° C. or even lower.

Figure 1A:
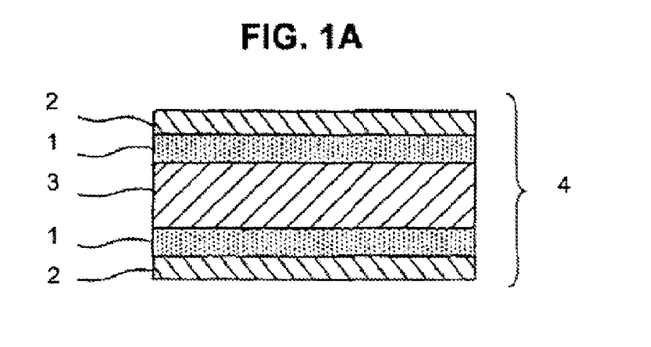
FIG. 1A is a typical arrangement of an aluminium alloy multi-layered brazing sheet product according to the present disclosure.
Figure 1B:
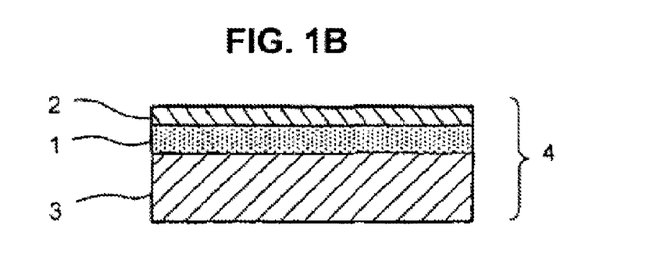
FIG. 1B is another typical arrangement of an aluminium alloy multi-layered brazing sheet product according to the present disclosure.

Exemplary arrangements of the aluminium alloy multi-layered brazing sheet product 4, according to the present disclosure, are illustrated win FIGS. 1A and 1B. A covering clad layer 2 and an Al—Si alloy brazing clad layer 1 can be applied on both sides or on one side only of a core layer 3 and wherein the covering clad layer 2 forms the outer-layer of the aluminium alloy multi-layered brazing sheet product. When both sides are clad, the multi-layered brazing sheet product has five layers including the core alloy layer as shown in FIG. 1A. When one side is clad with the brazing material, the multi-layered brazing sheet product has a three-layer configuration as shown in FIG. 1B.

Figure 2:
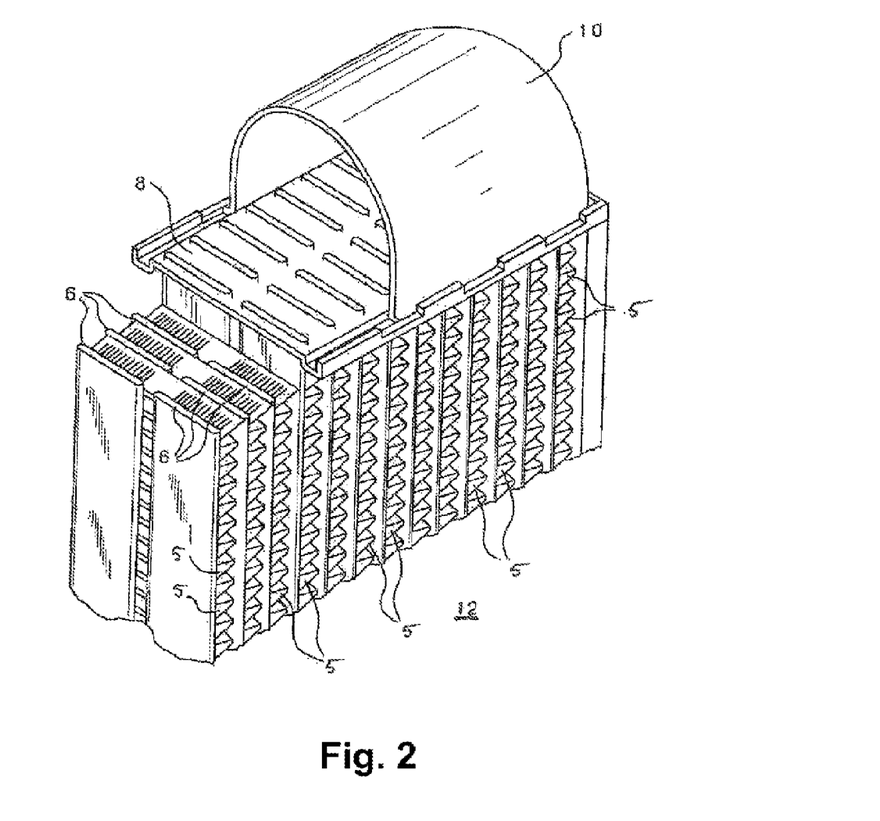
FIG. 2 is an isometric view of a portion of a brazed heat exchanger assembly according to the present disclosure.

FIG. 2 is an isometric view of a portion of a brazed heat exchanger assembly. As shown in FIG. 2, a brazed aluminium heat exchanger 12 in accordance with the present disclosure may include a plurality of fluid-carrying tubes 6 made from the multi-layered brazing sheet. The ends of the fluid-carrying tubes 6 are open to a header plate 8 and a tank 10 (one end of the fluid-carrying tubes 6, one header plate 8 and one tank 10 are shown in FIG. 2). Coolant is circulated from the tank 10, through the fluid-carrying tubes 6 and into another tank (not shown). As shown, a plurality of cooling fins 7 are disposed between the fluid-carrying tubes 6, in order to transfer heat away therefrom thereby facilitating a heat exchange cooling the fluid therein.

Illustrations

Illustration 1 is an aluminium alloy multi-layered brazing sheet product for brazing in an inert-gas atmosphere without a flux, comprising a core layer made of a 3xxx alloy comprising <0.20 wt. % Mg, and provided with a covering clad layer comprising 2 wt. % to 6 wt. % Si on one or both sides of said 3xxx alloy core layer and a Al—Si brazing clad layer comprising 7 wt. % to 13 wt. % Si positioned between the 3xxx alloy core layer and the covering clad layer, wherein the covering clad layer has a thickness $X_1$ and the Al—Si brazing clad layer has a thickness $X_2$ and wherein $X_2 \geq 2X_1$.

Illustration 2 is the multi-layered brazing sheet product according to any preceding or subsequent illustration, wherein the 3xxx alloy core layer comprises up to 0.1% Mg.

Illustration 3 is the multi-layered brazing sheet product according to any preceding or subsequent illustration, wherein the covering clad layer is Bi-free and Li-free.

Illustration 4 is the multi-layered brazing sheet product according to any preceding or subsequent illustration, wherein the covering clad layer is Mg-free, Bi-free and Li-free, and comprises, in wt. %,
  Si 2% to 6%;
  Fe up to 0.5%;
  Mn up to 0.2%;
  Cu up to 0.1%;
  Zn up to 0.4%;

Ti up to 0.1%;
inevitable impurities, each <0.05%, total <0.15%, balance aluminium.

Illustration 5 is the multi-layered brazing sheet product according to any preceding or subsequent illustration, wherein the covering clad layer has a Si content in the range of 2.5% to 5%.

Illustration 6 is the multi-layered brazing sheet product according to any preceding or subsequent illustration, wherein the 3xxx alloy core layer comprises, in wt. %,
0.5% to 1.8% Mn;
<0.20% Mg;
up to 1.1% Cu;
up to 0.7% Si;
up to 0.7% Fe;
up to 0.3% Cr;
up to 0.3% Sc;
up to 0.3% Zr and/or V;
up to 0.25% Ti;
up to 1.7% Zn;
unavoidable impurities each up to 0.05% and total up to 0.2%, and balance aluminium.

Illustration 7 is the multi-layered brazing sheet product according to any preceding or subsequent illustration, wherein the 3xxx alloy core layer has a Cu content up to 0.15%.

Illustration 8 is the multi-layered brazing sheet product according to any preceding or subsequent illustration, wherein the 3xxx alloy core layer has a Cu content in the range of 0.15% to 1.1%.

Illustration 9 is the multi-layered brazing sheet product according to any preceding or subsequent illustration, wherein the 3xxx alloy core layer has a Cu content in the range of 0.20% to 0.9%.

Illustration 10 is the multi-layered brazing sheet product according to any preceding or subsequent illustration, wherein the Al—Si brazing clad layer comprises, in wt. %,
Si 7%-13%;
Mg up to 0.5%;
Fe up to 0.7%;
Cu up to 0.3%;
Mn up to 0.8%;
Zn up to 2%;
Bi up to 0.3%;
Ti up to 0.25%;
balance aluminium and unavoidable impurities each <0.05%, total <0.2%.

Illustration 11 is the multi-layered brazing sheet product according to any preceding or subsequent illustration, wherein the Al—Si brazing clad layer has a Si content of 10% to 13%

Illustration 12 is the multi-layered brazing sheet product according to any preceding or subsequent illustration, wherein the Al—Si brazing clad layer has a Mg content of 0.02% to 0.5%

Illustration 13 is the multi-layered brazing sheet product according to any preceding or subsequent illustration, wherein the Al—Si brazing clad layer has a Bi content of 0.06% to 0.3%.

Illustration 14 is the multi-layered brazing sheet product according to any preceding or subsequent illustration, wherein the multi-layered brazing sheet is surface treated with an alkaline or acidic etchant before a brazing step.

Illustration 15 is the multi-layered brazing sheet product according to any preceding or subsequent illustration, wherein the covering clad layer has a thickness $X_1$ and the Al—Si brazing clad layer has a thickness $X_2$ and wherein $X_2 \geq 2.5 X_1$.

Illustration 16 is the multi-layered brazing sheet product according to any preceding or subsequent illustration, wherein $X_2 \geq 3 X_1$.

Illustration 17 is the multi-layered brazing sheet product according to any preceding or subsequent illustration, wherein at least one of the core layer, the Al—Si brazing clad layer, or the covering clad layer comprises at least 0.05 wt. % Ti.

Illustration 18 is a process for the production of a braze heat exchanger, comprising the steps of: providing at least one aluminium alloy multi-layered brazing sheet product according to any of the preceding or subsequent examples; and brazing in a flux-free controlled atmosphere brazing (CAB).

Illustration 19 the process according to any of the preceding or subsequent illustrations wherein the multi-layered brazing sheet is surface treated with an alkaline or acidic etchant before a brazing step.

Illustration 20 is use of an aluminium alloy multi-layered brazing sheet product according to any of the preceding illustrations in a flux-free controlled atmosphere brazing (CAB) operation to produce a heat exchanger apparatus.

All patents, publications and abstracts cited above are incorporated herein by reference in their entireties. Various embodiments of the present disclosure have been described in fulfilment of the various objectives of the present disclosure. It should be recognized that these embodiments are merely illustrative of the principles of the present disclosure. Numerous modifications and adaptions thereof will be readily apparent to those skilled in the art without departing from the spirit and scope of the present disclosure as defined in the following claims.

What is claimed is:

1. An aluminium alloy multi-layered brazing sheet product for brazing in an inert-gas atmosphere without a flux, comprising:
a core layer made of a 3xxx alloy comprising less than 0.20 wt. % Mg and 0.15 wt. % to 1.1 wt. % Cu, and provided with a covering clad layer comprising 2 wt. % to 6 wt. % Si and 0.06 wt. % to 0.20 wt. % Mn positioned on a first side of the 3xxx alloy core layer; and
a Al—Si brazing clad layer comprising 7 wt. % to 13 wt. % Si positioned between the 3xxx alloy core layer and the covering clad layer,
wherein the covering clad layer has a thickness $X_1$ and the Al—Si brazing clad layer has a thickness $X_2$ and wherein $X_2 \geq 2 X_1$, wherein at least one of the core layer or the covering clad layer comprises at least 0.05 wt. % Ti.

2. The multi-layered brazing sheet product according to claim 1, wherein the 3xxx alloy core layer comprises up to 0.1 wt. % Mg.

3. The multi-layered brazing sheet product according to claim 1, wherein the covering clad layer is Bi-free and Li-free, wherein Bi-free means below 0.005 wt. % Bi and Li-free means below 0.005 wt. % Li.

4. The multi-layered brazing sheet product according to claim 1, wherein the covering clad layer comprises, in wt. %,
Si 2% to 6%;
Fe up to 0.5%;
Mn 0.06 to 0.20%;
Cu up to 0.1%;
Zn up to 0.4%;

Ti up to 0.1%;
inevitable impurities, each up to 0.05% and total up to 0.15%; and balance aluminium.

5. The multi-layered brazing sheet product according to claim 4, wherein the covering clad layer has a Si content in the range of 2.5% to 5%.

6. The multi-layered brazing sheet product according to claim 1, wherein the 3xxx alloy core layer comprises, in wt. %,
0.5% to 1.8% Mn;
less than 0.20% Mg;
up to 1.1% Cu;
up to 0.7% Si;
up to 0.7% Fe;
up to 0.3% Cr;
up to 0.3% Sc;
up to 0.3% Zr;
up to 0.3% V;
up to 0.25% Ti;
up to 1.7% Zn;
unavoidable impurities each up to 0.05% and total up to 0.2%; and balance aluminium.

7. The multi-layered brazing sheet product according to claim 6, wherein the 3xxx alloy core layer has a Cu content in the range of 0.20% to 0.9%.

8. The multi-layered brazing sheet product according to claim 1, wherein the Al—Si brazing clad layer comprises, in wt. %,
Si 7%-13%;
Mg up to 0.5%;
Fe up to 0.7%;
Cu up to 0.3%;
Mn up to 0.8%;
Zn up to 2%;
Bi up to 0.3%;
Ti up to 0.25%; and
balance aluminium and unavoidable impurities each up to 0.05% at total up to 0.2%.

9. The multi-layered brazing sheet product according to claim 8, wherein the Al—Si brazing clad layer has a Si content of 10% to 13%.

10. The multi-layered brazing sheet product according to claim 8, wherein the Al—Si brazing clad layer has a Mg content of 0.02% to 0.5%.

11. The multi-layered brazing sheet product according to claim 8, wherein the Al—Si brazing clad layer has a Bi content of 0.06% to 0.30%.

12. The multi-layered brazing sheet product according to claim 1, wherein a surface of the multi-layered brazing sheet is surface treated with an alkaline or acidic etchant.

13. The multi-layered brazing sheet product according to claim 1, wherein the covering clad layer has a thickness $X_1$ and the Al—Si brazing clad layer has a thickness $X_2$ and wherein $X_2 \geq 2.5 X_1$.

14. The multi-layered brazing sheet product according to claim 13, wherein $X_2 > 3 X_1$.

15. The multi-layered brazing sheet product according to claim 1, wherein the Al—Si brazing clad layer comprises at least 0.05 wt. % Ti.

16. The multi-layered brazing sheet product according to claim 1, wherein the 3xxx alloy core layer has a Cu content in the range of 0.25 wt. % to 1.1% wt. %.

17. A process for the production of a braze heat exchanger, comprising the steps of:
providing at least one aluminium alloy multi-layered brazing sheet product according to claim 1; and
brazing in a flux-free controlled atmosphere brazing (CAB).

18. The process of claim 17, wherein the multi-layered brazing sheet is surface treated with an alkaline or acidic etchant before a brazing step.

* * * * *